Nov. 3, 1970    R. M. WEBSTER, JR    3,537,696
MULTISTAGE SUSPENSION
Filed May 15, 1968    2 Sheets-Sheet 1
FIG.3.    FIG.I.
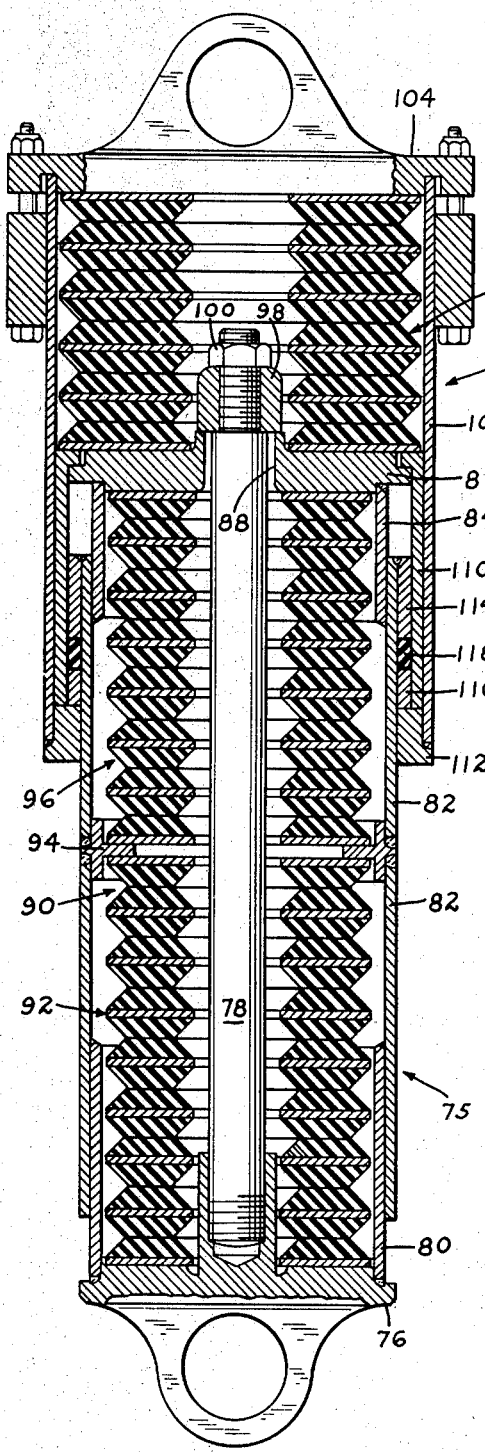
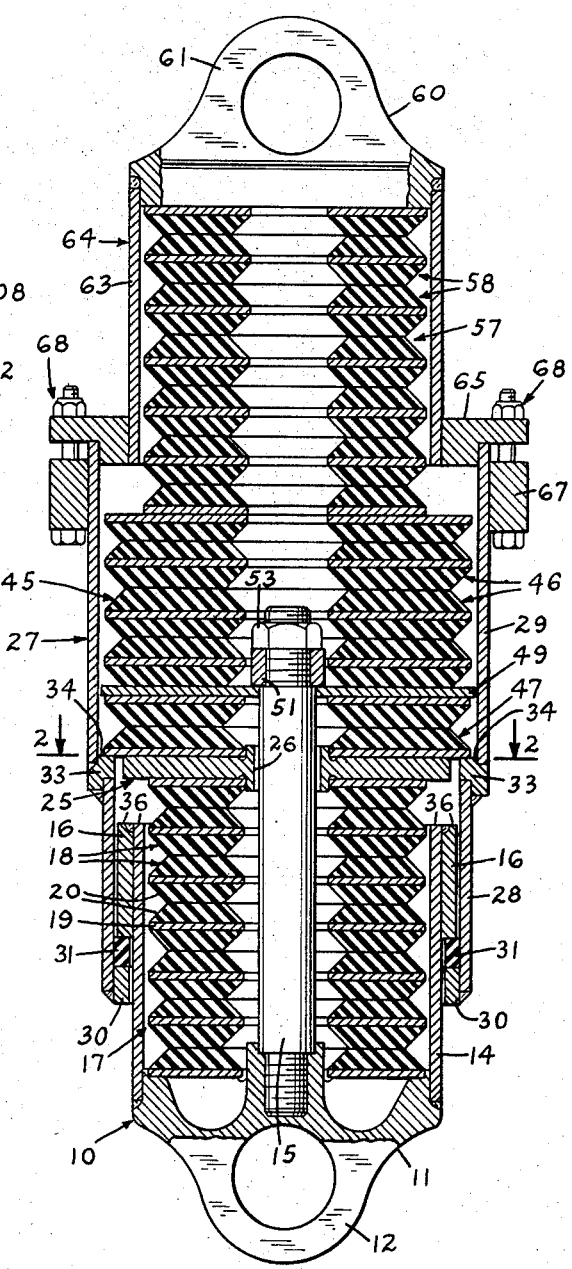
INVENTOR
ROBERT M. WEBSTER, JR.
BY
Brumbaugh, Free, Graves & Donohue
HIS ATTORNEYS

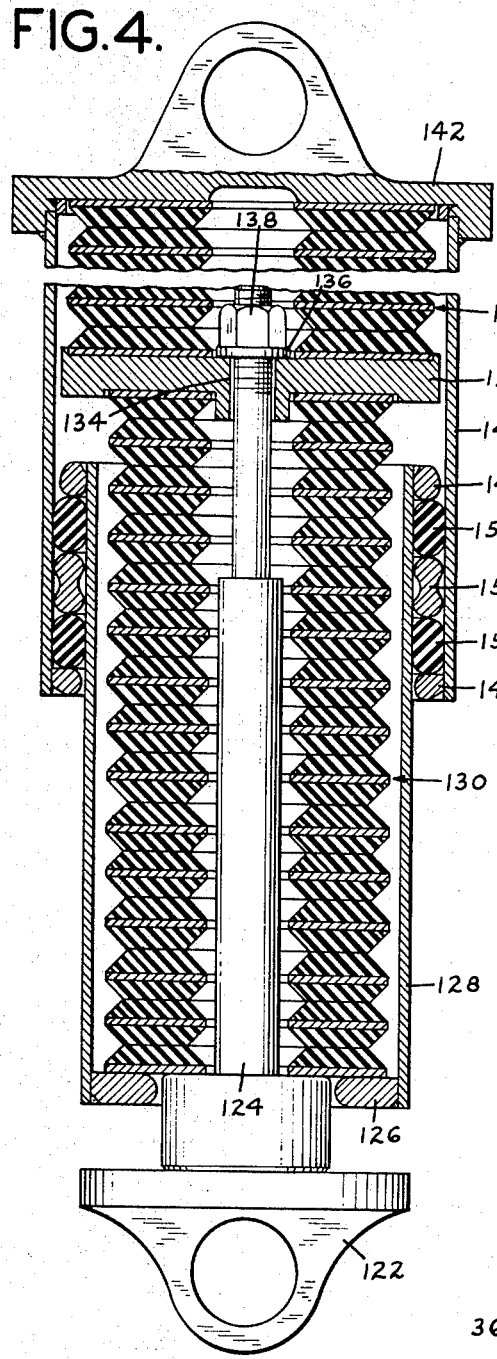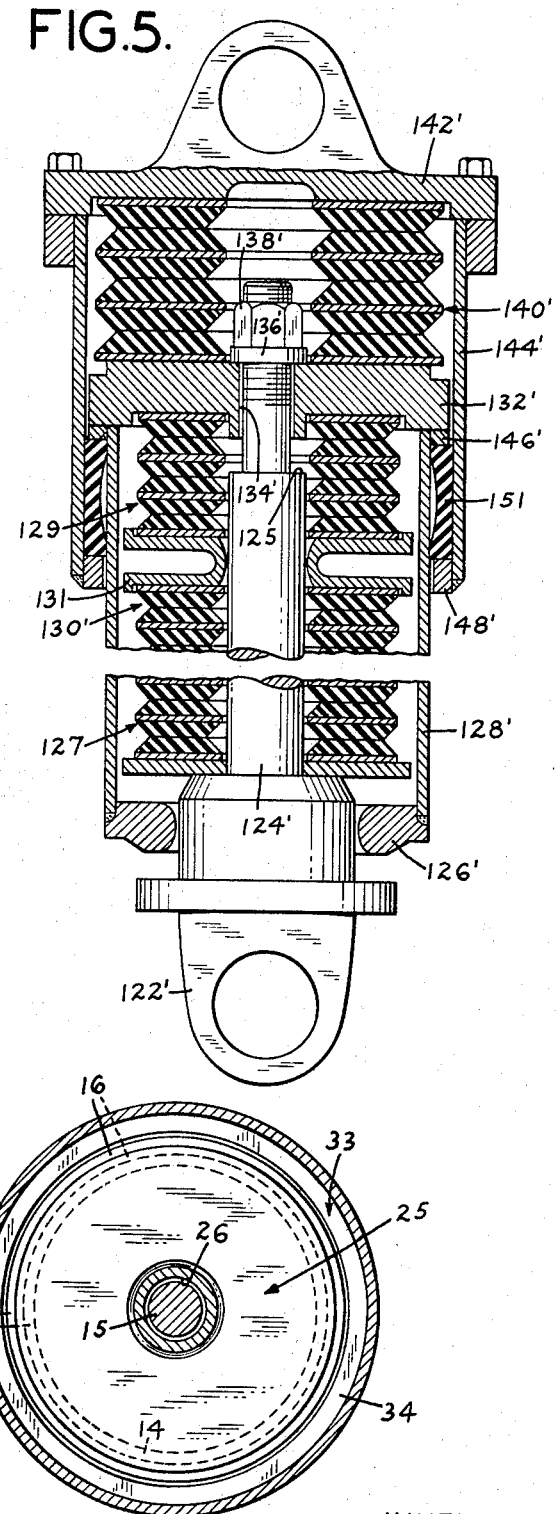

United States Patent Office 3,537,696
Patented Nov. 3, 1970

3,537,696
MULTISTAGE SUSPENSION
Robert M. Webster, Jr., Emmaus, Pa., assignor to Mack Trucks, Inc., Allentown, Pa., a corporation of New York
Filed May 15, 1968, Ser. No. 729,343
Int. Cl. B60g 11/22
U.S. Cl. 267—63                                16 Claims

ABSTRACT OF THE DISCLOSURE

A multistage suspension for resiliently supporting a first member relative to a second member under variable load conditions comprising two or more spring stages, one more readily compressible than the other stage or stages, a mechanism for limiting the compression of the more readily compressible spring stage and transferring the load to the less compressible spring stage or stages in turn, and a mechanism for cushioning the rebounding of the suspension.

The present invention relates to vehicular suspension systems and, more particularly, to improved spring suspensions providing effective springing of a vehicle under a wide range of load conditions.

Vehicle suspensions composed of multiple metallic or rubber spring elements designed to suspend properly an unloaded vehicle as well as a fully loaded vehicle are well known to the art. In one conventional type of suspension a relatively flexible spring, for suspending an unloaded vehicle, is disposed in series with a stiffer spring, which supports the vehicle properly under heavy load conditions. In such an arrangement, however, the lighter springs are frequently overflexed and may be damaged when the vehicle is heavily loaded.

In the application Ser. No. 615,213 entitled, "Two-Stage Rubber Vehicle Suspension," which was filed Feb. 10, 1967, now Pat. No. 3,434,708, a vehicle suspension is disclosed which overcomes the above-mentioned disadvantages of the prior art. This is accomplished by limiting the flexing of the spring assembly which is operative principally when the vehicle is lightly loaded and transferring the load to another spring assembly designed to support the vehicle when loaded heavily.

The rebounding of these suspensions designed to operate under a wide range of loads can damage or seriously limit the life of the suspension. Such rebounding occurs when the load on the suspension is momentarily removed, and this happens often when the vehicle travels over a rough road, for example. The various elements of the suspension are expanded to their limit by very large forces equal to those which normally compress the suspension.

In accordance with the present invention, a suspension is provided having a first spring stage operative principally when the vehicle is unloaded or slightly loaded, one or more secondary spring stages designed to support the vehicle as the load is increased, means for limiting the flexing of the first spring stage and transferring the load to the secondary spring stage or stages, and means for cushioning the rebounding of the suspension.

More particularly, according to one embodiment, a portion of one of the first and second spring stages is compressed to cushion the suspension rebound. In another embodiment additional spring means which do not have a load supporting function are compressed as the load on the suspension is removed. In still another embodiment, the rebounding cushioning means includes an independent spring means in conjunction with means for compressing one of the first and second spring stages as the load on the suspension is removed.

For a more complete understanding of the invention, reference may be had to the accompanying drawings, in which:

FIG. 1 is a sectional view of one embodiment of suspension in accordance with the invention;
FIG. 2 is a view taken along the line 2—2 of FIG. 1 and looking in the direction of the arrows;
FIG. 3 is a sectional view of another embodiment of suspension according to the invention;
FIG. 4 is a sectional view of still another embodiment of the invention; and
FIG. 5 is a sectional view of yet another embodiment of the invention.

In the representative embodiment of the invention shown in FIGS. 1 and 2, a lower housing 10 includes an end member 11 having a lug 12 adapted to be mounted on the axle (not shown) of a vehicle. The lower housing 10 also has a cylindrical lateral wall 14 with an annular ring 16 bonded to the upper outer surface thereof, and a centrally located shaft 15 is secured to the end member 11. Received in the lower housing 10 is a first spring stage 17 which preferably includes a stack of elastomer pads 18, each pad consisting of a central annular metal plate 19 to the opposite sides of which elastomer discs 20 are bonded, although other suitable spring elements may be used. The first spring stage 17 is relatively resilient and is designed for properly suspending an unloaded or slightly loaded vehicle. The lower end of the first spring stage 17 engages the end member 11 and the upper end thereof engages a spacer plate 25 which is slidably carried by the shaft 15, the shaft 15 extending through a central bore 26 in the spacer plate 25.

A multipart intermediate housing 27 includes a lateral lower wall 28 and a lateral upper wall 29, an annular ring 30 being bonded to the lower inner surface of the lower wall 28. An annular elastomer snubbing ring 31 is disposed between the intermediate housing lower ring 30 and the lower housing ring 16, and the snubbing ring is adapted to be compressed thereby to limit the extent to which the lower housing 10 can be withdrawn from the intermediate housing 27. An annular ring 33 is bonded to the upper outer surface of the lower wall 28 and to the lower inner surface of the upper wall 29, the ring 33 providing an upwardly facing abutting surface 34 extending laterally inwardly of the lower end of the upper wall 29.

Enclosed by the lateral wall 29 of the intermediate housing 27 is a second spring stage 45 which preferably also includes a stack of elastomer pads 46, but the pads 46 are less resilient than the pads 18 of the first stage 17 and are designed to support the vehicle with proper springing when the vehicle is heavily loaded. The lower portion 47 of the second spring stage 45 is interposed between the spacer plate 25 and a spacer plate 49 which is slidably carried by the shaft 15 and is retained thereon by a spacer 51 and a nut 53, which threadedly engages the upper end of the shaft 15. The nut 53 is preferably tightened to preload the first spring stage 17 and the portion 47 of the second spring stage 45.

The upper end of the second spring stage 45 engages the lower end of a third spring stage 57 which also preferably includes a stack of elastomer pads 58, which are less resilient than the pads 46 of the second spring stage 45. The resiliency of the pads 58 may be equal to that of the pads 18 of the first stage 17, in which case the third spring stage acts with the first spring stage to support the vehicle in the unloaded and lightly loaded states. Alternatively, the resiliency of the pads 58 may be less than that of the pads 18 of the first stage but greater than that of the pads 46 of the second stage. Thus in the alternative embodiment the third spring stage 57 is designed to support the vehicle under loads intermediate the unloaded and heavily loaded states.

The upper end of the third spring stage 57 engages an upper end member 60 which has a lug 61 adapted to be mounted on the frame (not shown) of the vehicle. A cylindrical lateral wall 63 depending from the end member 60 comprises an upper housing 64 and encloses the third spring stage 57. Secured to the lower portion of the lateral wall 63 by welding or the like is an outwardly extending annular flange 65, the lower surface of which is preferably flush with the lower edge of the wall 63. A corresponding annular flange 67 is bonded to the outside of the lateral wall 29 near the upper edge thereof, and the upper edge of the wall 29 is securely fastened against the flange 65 by a plurality of nuts and bolts 68. These nuts and bolts 68 are also used to impart preloading to the spring stages 17, 45 (including the portion 47) and 57 in addition to the above-mentioned preloading of the first stage 17. The preloading of these multiple stages is desirable to provide an assembly which remains under a predetermined load at all times and thus facilitates maintaining alignment of the load pads.

The suspension according to FIGS. 1 and 2 may be assembled by first stacking on the lower housing shaft 15 the first spring stage 17, the spacer plate 25, the second spring stage portion 47, the spacer plate 49 and the spacer 51. The nut 53 is then tightened to preload the first spring stage and the portion 47 of the second spring stage. Then the lower housing 10, carrying the snubbing ring 31, is inserted into the intermediate housing 27. The other pads of the second spring stage 45 are placed in position on the spacer plate 49, and the third spring stage 57 is stacked on the second spring stage. The upper housing 64 is then placed in position, and the nuts and bolts 68 are tightened to fasten the upper and intermediate housings together and to preload the three spring stages.

In operation, as the load on the vehicle increases the lower housing 10 moves into the lateral wall 28 of the intermediate housing 27, thereby compressing the first spring stage 17, the second spring stage 45 and the third spring stage 57. The lower housing shaft 15 passes freely through the spacer plates 25 and 49. As the load increases, the upper abutting edges 36 of the lower housing lateral wall 14 and the annular ring 16 engage the lower surface of the spacer plate 25, thus preventing further compression of the first spring stage 17.

For the embodiment in which the resiliency of the third spring stage 57 equals that of the first spring stage, the third spring stage is compressed by the second spring stage 45 against the upper end member 60 during the compression of the first spring stage inasmuch as the relatively stiff second stage compresses very slightly while the relatively resilient first and third stages are compressed. The compression of the third stage 57 is stopped after the upper end of the second stage 45 engages the lower edge of the lateral wall 63 and the lower surface of the flange 65. The resiliency of the first and third stages being equal, the upper end of the second stage will engage the lower surface of the flange 65 at the same time that the abutting edges 36 of the lateral wall 14 and the ring 16 engage the lower surface of the spacer plate 25.

For the alternative embodiment in which the resiliency of the third stage 57 is intermediate that of the first and second stages, the compression of the third stage continues after the compression of the first stage has stopped, i.e., after the abutting edges 36 engage the spacer plate 25.

After the upper end of the second stage 45 engages the lower edges of the lateral wall 63 and the flange 65 according to either of the above alternate embodiments regarding the resiliency of the third stage 57, additional increase of the load compresses the second stage 45 (including the portion 47 thereof) between the lower edge of the lateral wall 63 and the lower surface of the flange 65 of the upper housing 64, and the upper surface of the spacer plate 25, the lower surface of which is in engagement with the lower housing abutting edges 36.

It is to be understood that the capacity and deflection of each of the three spring stages as well as the preloading of the three spring stages may be adjusted to provide a suspension which will result in the desired ride characteristics over any particular range of loads.

When the load is removed, which may happen rapidly when the vehicle drives over a bump, for example, the second spring stage 45 expands first, after which the first and third stages expand, the upper end of the second stage 45 moving downwardly from the lower end of the lateral wall 63, and the lower end of the second stage portion 47 moving downwardly until it abuts with the upper surface 34 of the intermediate housing annular ring 33.

The rebounding of the suspension is cushioned because the second stage portion 47 is now compressed between the spacer plate 49 and the upper surface 34 of the annular ring 33 of the intermediate housing 27, since the spacer plate 49 is connected to the lower housing 10 by the spacer 51 and nut 53 on the shaft 15. The compression of the rebound cushion 47 is finally limited as the elastomer snubbing ring 31 is compressed between the ring 16 on the lower housing and the ring 30 on the intermediate housing.

Referring now to the embodiment of the invention shown in FIG. 3, a lower housing 75 includes an end member 76 from which extend upwardly a centrally located shaft 78 and a lateral cylindrical wall 80. A main lateral wall 82 slidably engages the lateral wall 80 on the end member 76 and a lateral cylindrical wall 84 which depends from a spacer 86 having a central bore 88 through which the shaft 78 freely extends. Enclosed in the lower housing 75 is a first spring stage 90 including a first stack of elastomer pads 92 which is preferably constructed as those of the first embodiment and which is disposed between the lower end member 76 and an internal annular flange 94 bonded to the interior of the main lateral wall 82. The first stage also includes another stack of elastomer pads 96 disposed between the flange 94 and the spacer 86. The spring sections 92 and 96 are relatively resilient, although they need not have the same characteristic, and they are designed to support the vehicle when it is unloaded or lightly loaded. The spacer 86 is retained on the shaft 78 by a spacer 98 and a nut 100 which threadedly engages the shaft 78. The nut 100 is preferably tightened to preload the spring sections 92 and 96 of the first spring stage 90.

The lower housing 75 is received in an upper housing 102 which includes an upper end member 104 from which depends a lateral cylindrical wall 106. The upper housing 102 encloses a second spring stage 108 which engages the upper end member 104 and the spacer 86. The second stage 108 also includes a stack of elastomer pads similar to those of the first stage, but the second stage pads are less resilient and are designed to support the vehicle properly when it is heavily loaded.

An annular stop member 110 is slidably received in the lateral wall 106 and engages the lower end of the second spring stage 108 at its periphery. When the suspension is unloaded, as illustrated in FIG. 3, the lower end of the stop member 110 engages the upper surface of an internal annular flange 112 bonded to the interior of the lateral wall 106 at the lower edge thereof. An annular flange 114 is bonded to the exterior of the main lateral wall 82 at the upper edge thereof, and disposed between the lateral wall 82 and the annular stop member 110, and between the flanges 112 and 114, are an annular ring 116 and an annular elastomer snubbing ring 118.

In operation, as the vehicle load increases the two stacks of elastomer pads 92 and 96 of the first spring stage 90 are compressed between the lower end member 76 and the spacer 86 until the latter two members are engaged by the main lateral wall 82, after which further compression of the first spring stage is prevented. In particular, further compression of the spring sections 92 and 96 is prevented after the lateral wall 82 engages the end member 76 and the spacer 86, respectively. Additional load on the vehicle is transferred to the second spring stage 108, which is compressed between the spacer 86 and the upper end member 104.

When the load is removed, the second spring stage 108 expands until the lower edge of the annular stop member 110 engages the annular flange 112 of the upper housing 102, since the lower end of the second spring stage is in engagement with the upper edge of the stop member 110. Then the spring sections 92 and 96 of the first spring stage 90 expand until the nut 100 and the spacers 98 and 86 are in engagement, as shown in FIG. 3. Thereafter the shaft 78 continues its downward movement as the suspension rebounds, pulling the spacer 86 down until it engages the upper edge of the main lateral wall 82 and the flange 114 thereon, the rebound being cushioned by the compression of the spring section 96 between the spacer 86 and the internal flange 94. Further compression of the spring section 96 is prevented when the spacer 86 engages the upper edge of the main lateral wall 82, and further downward travel of the shaft 78 and the spacer 86 is limited as the elastomer snubbing ring 118 is compressed between the flange 114 and the ring 116.

Another embodiment of the invention is shown in FIG. 4, where a lower end member 122 having a central shaft 124 is slidably received by an inwardly extending annular flange 126 bonded to the interior of a lateral cylindrical wall 128 at the lower end thereof. The lateral wall 128 encloses a first spring stage 130 which engages at its upper end a spacer 132 and at its lower end the flange 126 when the suspension is in its unloaded state as illustrated in FIG. 4. The first spring stage 130 is relatively resilient and is designed to support properly the vehicle in its unloaded or lightly loaded state.

The shaft 124 extends freely through a central bore 134 in the spacer 132, and the spacer 132 is retained on the shaft by a spacer 136 and a nut 138 which threadedly engages the shaft 124. The nut 138 is preferably tightened to preload the first spring stage 130. The upper surface of the spacer 132 engages a second spring stage 140, the upper end of which engages an upper end member 142 from which depends a lateral cylindrical wall 144. The second spring stage is less resilient and is designed to support the vehicle with proper springing when it is heavily loaded. Each of the spring stages is preferably composed of a stack of elastomer pads similar to those of the spring stages of the other embodiments discussed above.

Between an outwardly extending annular flange 146 at the upper edge of the lateral wall 128 and an inwardly extending annular flange 148 at the lower edge of the lateral wall 144 are disposed a pair of annular elastomer rebound cushioning elements 150 and 152, between which is an annular ring 154. The resiliency of the rebound cushioning elements 150 and 152 may be equal or may differ from each other.

In operation, as the load is increased the first spring stage 130 is compressed until the opposite ends of the lateral wall 128 engage the spacer 132 and the lower end member 122, after which further compression of the first spring stage is prevented. Additional load is transferred to the second spring stage 140, which is compressed between the spacer 132 and the upper end element 142.

When the load is removed, the second spring stage 140 expands, after which the first spring stage 130 expands, and the opposite ends of the lateral wall 128 separate from the spacer 132 and the lower end member 122. Further downward movement of the end member 122 and the shaft 124 compresses the first spring stage 130 between the spacer 132 and the annular flange 126, this compression of the first spring stage cushioning the rebounding of the suspension. When the spacer 132 engages the upper edge of the lateral wall 128, further compression of the first spring stage is prevented, further cushioning of the rebound being provided as the rebound cushions 150 and 152 are compressed between the flanges 146 and 148, the ring 154 distributing the rebound forces between the two rebound cushions 150 and 152. Thus, during rebound the first spring stage 130 and the rebound cushions 150 and 152 comprise a multistage rebound cushioning mechanism.

A further embodiment of the invention is shown in FIG. 5. Corresponding elements of the embodiments of FIGS. 4 and 5 are indicated by the same reference numerals, primes being added in FIG. 5. The principal differences are that the cushioning of the suspension rebound is accomplished by a single annular elastomer rebound cushion 151 disposed between the flanges 146' and 148', the first and second spring stages 130' and 140' serving only to support the vehicle in its lightly loaded and heavily loaded states, respectively. Also, the first spring stage 130' is composed of a spring section 127, which engages the lower end member 122' and a spacer 131 slidable on the shaft 124', and a spring section 129, which engages the spacers 131 and 132'. The spring sections 127 and 129 may be of the same or differing characteristics, in accordance with the desired ride charactristics.

In operation, as the load is increased the first spring stage 130' is compressed between the lower end member 122' and the spacer 132' until the end member 122' engages the flange 126', at which time a shoulder 125 of the shaft 124' engages the spacer 132', after which further compression of the spring sections 127 and 129 is prevented. Additional load is transferred to the less resilient second spring stage 140'.

When the load is removed, the second spring stage 140' expands, after which the first spring stage 130' expands until the nut 138' and the spacers 132' and 136' are in engagement. Then the suspension rebound is cushioned as the spacer 132' compresses the rebound cushion 151 between the flanges 146' and 148'.

It will be understood by those skilled in the art that the representative embodiments described above are susceptible of modifications and changes without departing from the spirit and scope of the invention. For example, the novel rebound cushioning mechanism may be incorporated in suspensions having only one spring stage. Thus, the embodiment of FIG. 1 could be modified to have a single spring stage by omitting the first and third spring stages 17 and 57, the lateral wall 14 and annular ring 16 being extended to normally engage, or to be bonded to, the spacer plate 25. The upper end of the remaining spring stage 45, which would be of the proper resiliency to provide the best overall springing over a particular range of loads, would normally engage the lower edge of the wall 63 and the lower surface of the flange 65. The spring stage portion 47 could be preloaded by the nut 53, and the entire spring stage 45 could be preloaded between the lower edge of the wall 63 and the abutting surface 34 of the ring 33.

Similarly, the embodiment of FIG. 3 could be modified to provide a suspension having only one spring stage by omitting the second spring stage 108 and inverting the annular stop member 110 and disposing it in the wall 106 so that it normally abutts the spacer 86 and the upper end member 104. Also, the radially extending portion of the annular flange 94 could be omitted and the two stacks 92 and 96 replaced by a single stack of elastomer pads.

The embodiments of FIGS. 4 and 5 could be so modified by omitting the second spring stages 140 and 140' and inserting an annular stop member in each of the lateral cylindrical walls 144 and 144', each stop member normally abutting the corresponding ones of the spacers 132 and 132' and the upper end members 142 and 142'. Thus, in the modified embodiments of FIGS. 3, 4 and 5 the annular stop member would prevent upward movement of the spacers 86, 132 and 132', respectively, from the positions illustrated, but would permit the spacers to move downwardly during rebound.

Furthermore, the present rebound cushioning mechanism may be incorporated in suspensions having other spring system, whether they be of one or more stages. Accordingly, all such modifications and changes are included in the intended scope of the invention as defined in the following claims.

I claim:

1. A multistage suspension for resiliently supporting a first member relative to a second member under variable load conditions comprising a first spring stage compressible under a first range of loads, a second spring stage compressible under a second range of heavier loads, means for mounting said first and second spring stages between said first and second members, means for limiting compression of said first spring stage and transferring the load to said second spring stage, and means for cushioning the rebounding of said suspension.

2. The suspension according to claim 1 wherein said first spring stages includes a first stack of resilient rubber pads and said second spring stage includes a second stage of less resilient rubber pads.

3. The suspension according to claim 1 wherein said rebound cushioning means includes at least a portion of one of said first and second spring stages, and means for compressing said portion as the load on said suspension is removed.

4. The suspension according to claim 3 wherein said compressing means includes stop means disposed on the side of said portion remote from said first member, said stop means being coupled to said first member, and spacer means on the side of said portion remote from said second member, said spacer means being coupled to said second member.

5. The suspension according to claim 1 wherein said means for limiting compression of said first spring stage and transferring the load to said second spring stage includes spacer means interposed between adjacent ends of said first and second spring stages, and a tubular housing secured to said second member and receiving said first spring stage, said tubular housing engaging said spacer means when a predetermined load level is reached.

6. The suspension according to claim 1 including a third spring stage compressible under a third stage of loads intermediate said first and second ranges of loads, means for mounting said third spring stage in operative relation to said second spring stage, and means for limting compression of said third spring stage and transferring the load to said second spring stage.

7. The suspension according to claim 6 wherein said means for limiting compression of said third spring stage and transferring the load to said second spring stage includes a tubular housing secured to said one of said first and second members and receiving said third spring stage, said tubular housing having stop means exteriorly of said third spring stage and engageable by said second spring stage when a predetermined load level is reached.

8. The suspension according to claim 1 wherein said means for mounting said first and second spring stages between said first and second members includes first and second telescopically related housings enclosing said first and second spring stages.

9. The suspension according to claim 8 wherein said rebounding cushioning means includes spring means disposed between overlapping portions of said first and second telescopically related housings, said spring means being compressed between an inwardly extending flange on the outer telescopically related housing and an outwardly extending flange on the inner telescopically related housing.

10. The suspension according to claim 9 wherein said rebounding cushioning means also includes means for compressing one of said first and second spring stages as the load on said suspension is removed.

11. A suspension for resiliently supporting a first member relative to a second member under variable load conditions comprising at least one spring stage compressible under the load, means for mounting said spring stage between said first and second members, means for cushioning the rebounding of said suspension, said rebound cushioning means including at least a portion of said spring stage, and means for compressing said portion as the load on said suspension is removed.

12. The suspension according to claim 11 wherein said compressing means includes stop means disposed on the side of said portion remote from said first member, said stop means being coupled to said first member, and spacer means on the side of said portion remote from said second member, said spacer means being coupled to said second member.

13. A suspension for resiliently supporting a first member relative to a second member under variable load conditions comprising at least one spring stage compressible under the load, means for mounting said spring stage between said first and second members, additional spring means for cushioning the rebounding of said suspension, and means for mounting said additional spring means between said first and second members.

14. The suspension according to claim 13 wherein said means for mounting said spring stage between said first and second members includes first and second telescopically related housings enclosing said spring stage.

15. The suspension according to claim 14 wherein said additional spring means for cushioning the suspension rebound is disposed between overlapping portions of said first and second telescopically related housings, said additional spring means being compressed between an inwardly extending flange on the outer telescopically related housing and an outwardly extending flange on the inner telescopically related housing.

16. The suspension according to claim 15 including means for compressing at least a portion of said spring stage as the load on said suspension is removed to cushion the suspension rebound.

References Cited

UNITED STATES PATENTS 3,434,708   3/1969   Hawk.

JAMES B. MARBERT, Primary Examiner

PO-1050
(5/69)

UNITED STATES PATENT OFFICE
CERTIFICATE OF CORRECTION

Patent No. __3,537,696__       Dated __Nov. 3, 1970__

Inventor(s) __R. M. Webster, Jr.__

It is certified that error appears in the above-identified patent and that said Letters Patent are hereby corrected as shown below:

Col. 6, line 24, "charactristics" should read --characteristics--;

Col. 7, line 3, "system" should read --systems--;

Col. 7, line 19, "stages" should read --stage--; and

Col. 7, line 43, "third stage" should read --third range--.

SIGNED AND
SEALED
JAN 26 1971

(SEAL)
Attest:

Edward M. Fletcher, Jr.
Attesting Officer

WILLIAM E. SCHUYLER, JR.
Commissioner of Patents